July 7, 1953            A. GAZDA            2,644,539

SNOW TRACK FOR MOTOR VEHICLES

Filed Nov. 25, 1949            5 Sheets-Sheet 1

INVENTOR
ANTOINE GAZDA,
BY
ATTORNEYS

INVENTOR
ANTOINE GAZDA,
BY
Wenderoth, Lind & Ponack
ATTORNEYS

July 7, 1953  A. GAZDA  2,644,539
SNOW TRACK FOR MOTOR VEHICLES
Filed Nov. 25, 1949  5 Sheets-Sheet 4

INVENTOR
ANTOINE GAZDA,
BY
ATTORNEYS

INVENTOR
ANTOINE GAZDA

Patented July 7, 1953

2,644,539

UNITED STATES PATENT OFFICE 2,644,539

SNOW TRACK FOR MOTOR VEHICLES

Antoine Gazda, Providence, R. I.

Application November 25, 1949, Serial No. 129,439

10 Claims. (Cl. 180—5)

The present invention relates to traction devices for wheeled vehicles and more particularly to provision of snow tracks of a simple construction.

It is old to provide skid chains for vehicles and endless belt traction devices of various types—these for the purpose of aiding the vehicle travel over snow or ice. Prior snow tracks or anti-skid devices have been either inadequate or so complicated in construction and attachment to the vehicle as to be impractical. Further, prior endless belt types of snow tracks have been provided with metal or other types of cleats or plates to obtain traction in the snow or in ice and were unsatisfactory when driving on cleared areas or hard roads.

A primary object of the present invention is the realization of a simple construction of an endless belt type of snow track for vehicles which will overcome the weaknesses of prior devices of this character. A further object is the provision of snow tracks which may be readily and securely attached to a vehicle with a minimum of time and effort.

To this end briefly stated, the device according to the present invention involves the provision of an endless belt type of snow tracks for a vehicle having a belt of flexible material trained over the rear driving wheels of the vehicle and further over one or more sets of idler wheels. The idler wheels being mounted on auxiliary axles which are attached to the rear truck of the vehicle and suspended in such a manner as to provide essentially individual springing for the idler wheels. This arrangement eliminates unsatisfactory devices for the purpose and avoids mechanical complications hereinbefore described and also enables the vehicle to be driven on snow, ice, or on cleared hard surface areas with equal facility.

In the accompanying drawings forming a part of this specification, like characters of reference denote similar parts throughout the several views and there is set forth the presently preferred embodiments of this invention.

Figure 1:
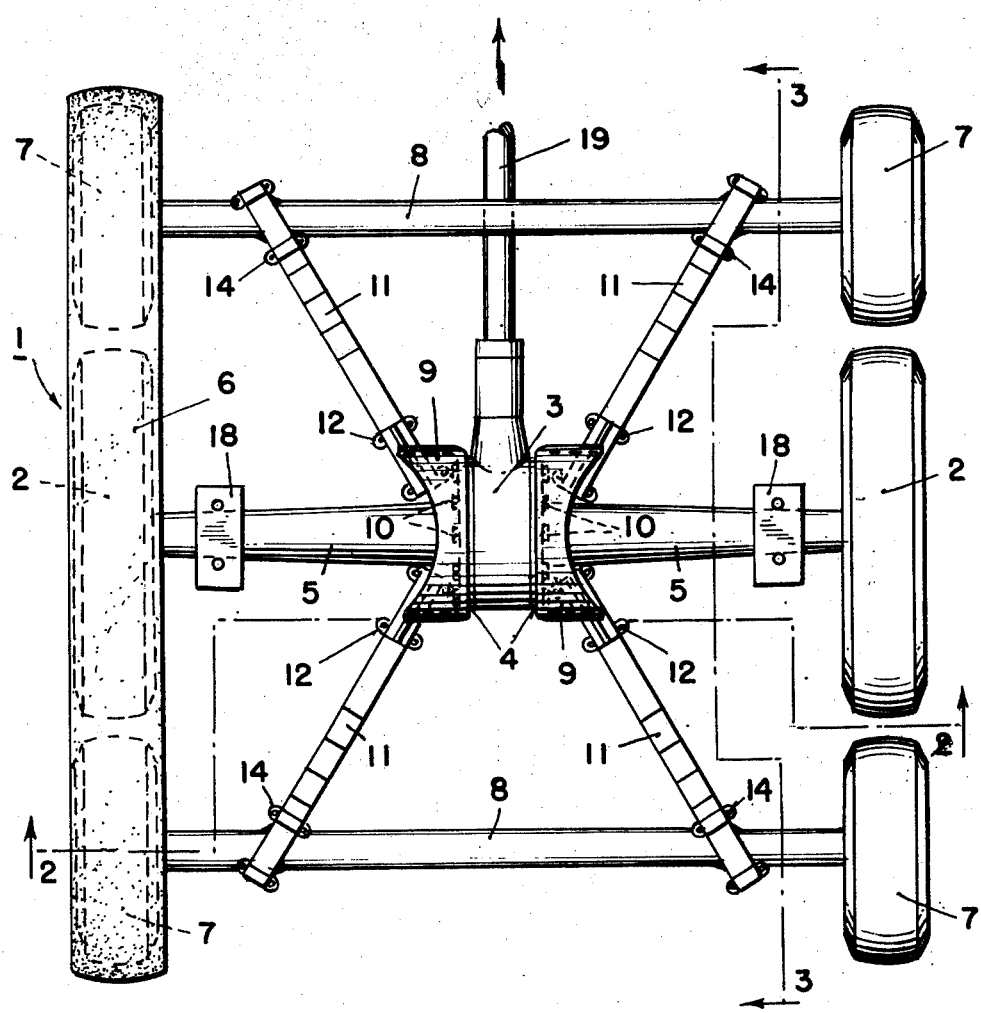
Fig. 1 is a top plan view of a form of the present invention showing its attachment to a vehicle having a differential housing with side plates integral with the rear axle housing, the snow track having two sets of auxiliary axles and wheels.
Figure 2:
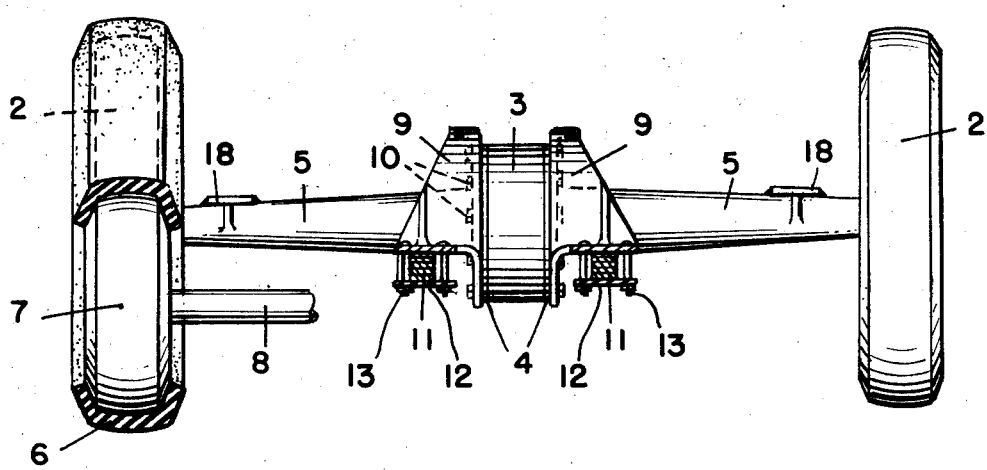
Fig. 2 is a sectional view taken substantially along the line 2—2 of Fig. 1.

Referring to the drawings, the snow track 1 is operatively connected with the rear driving wheels 2 of a vehicle. The snow track may be used on vehicles of any known type but for the purposes of this application only a few preferred types are shown.

Figure 3:
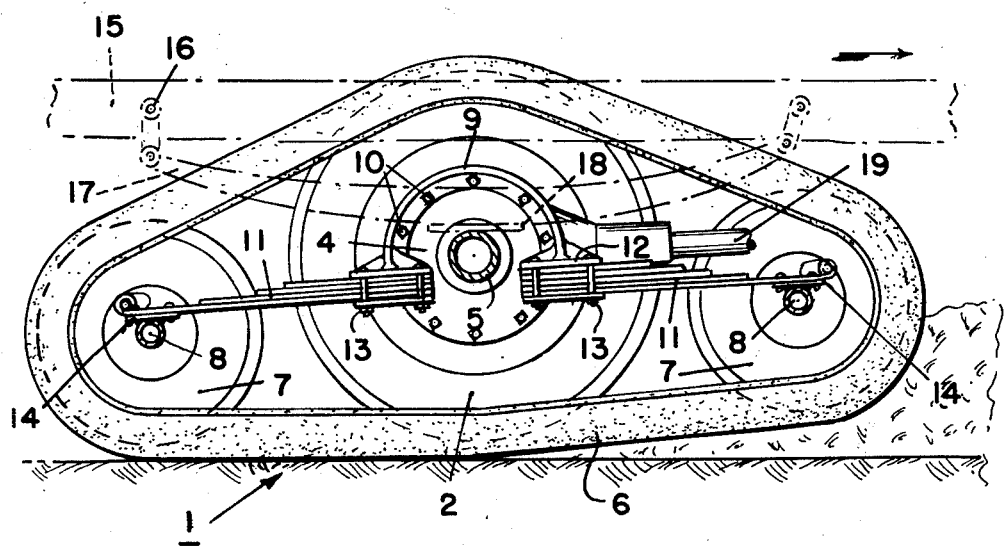
Fig. 3 is a sectional view taken along the line 3—3 of Fig. 1.

In Fig. 1 the invention is shown connected to a vehicle of the truck type having a differential housing 3 provided with detachable side plates 4 which are integral with the rear axle housing 5. The snow track 1 comprises an endless belt 6, which may be of any suitable material such as rubber impregnated fabric or the like, and which is trained over the rear driving wheels 2 having tires mounted thereon. A front and rear set of idler wheels 7 with tires thereon, are attached to the vehicle and are rotatably mounted on the auxiliary axles 8. The axles 8 are suspended from the rear truck of the vehicle by means of attaching plates 9 which are generally U-shaped in front elevation and L shaped in side elevation. The plates 9 fit on the outside of the side plates 4 of the differential housing 3 and are attached thereto by means of studs 10 which may replace the bolts holding the side plates 4 to the differential housing 3. The plates 9 fit over the rear axle housing 5, due to their substantially U-shaped construction, and may be constructed if desired of sufficient width to be further supported thereon. Cantilever springs 11 are secured to the attaching plate 9 by means of brackets 12, the upper half of which is formed integrally with the attaching plate 9, as shown in Fig. 3. The end of the spring 11 is secured between the upper half of the bracket 12 and the lower half by means of the bolts 13. The outer ends of the springs 11 are attached to the auxiliary axles 8 by means of the brackets 14, having the usual U bolts coacting therewith and with the axle. It is to be noted that with this arrangement each idler wheel 7 will act as though individually suspended with a spring of its own and permit a greater flexibility in the assembly. The rear drive wheels 2 of the vehicle are suspended from the frame 15 of the vehicle, shown partially in Fig. 3, by means of U bolts 16 and springs 17 which are attached to the plates 18 on the rear axle housing 5. In training the endless belt over the various wheels, the belt may be placed under the wheels and then, being sufficiently elastic, stretched over the tops of the tires.

In operation, the rear wheels 2 of the vehicle are driven by the drive shaft 19 operatively connected to the engine, not shown, of the vehicle acting through the differential. The endless belt 6, being trained over the wheels 2 and the idler wheels 7, will move when the wheels 2 rotate and at the peripheral speed thereof. A much larger area of traction will be available with this arrangement and slipping or skidding on ice or snow will be minimized. When the vehicle is moving in a forward direction, the front idler wheel 7 and the endless tread 6 trained thereover will tend to climb on top of the snow, packing down the same and presenting a more suitable traveling surface for the rearward portion of the track. The snow track mechanism may be so mounted at an angle with the ground (as shown in Fig. 3) that the front idler wheel 7 and the track 6 are raised above the ground to aid in the preparation of the surface before the lower central portion of the endless belt passes thereover and further to insure that no difficulty will arise from rough spots or obstacles in the path of the vehicle.

Figure 4:
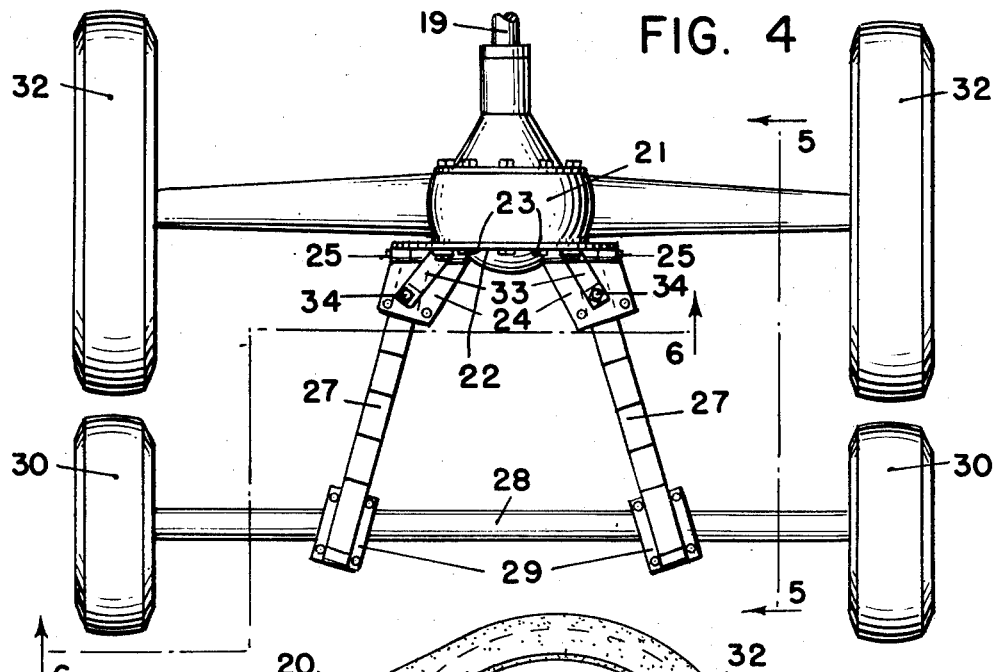
Fig. 4 is a top plan view showing the application of a modification of the invention adapted to vehicles havng banjo-type differential housings.
Figure 5:
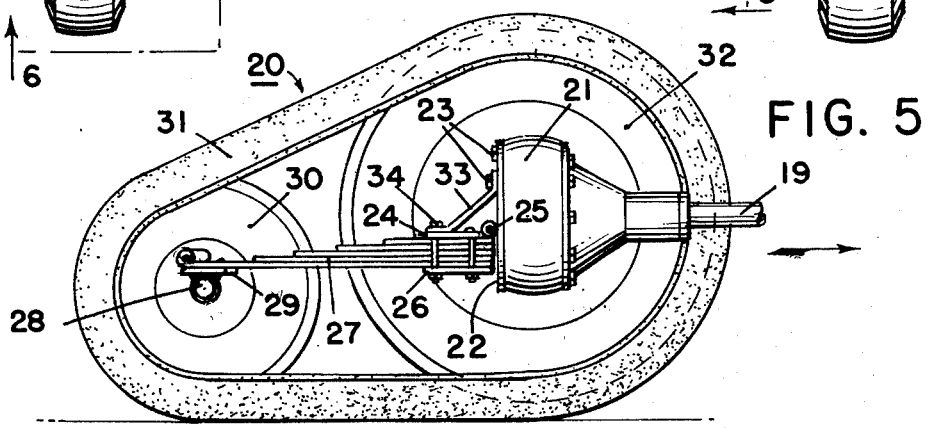
Fig. 5 is a sectional view taken along the line 5—5 of Fig. 4.
Figure 6:
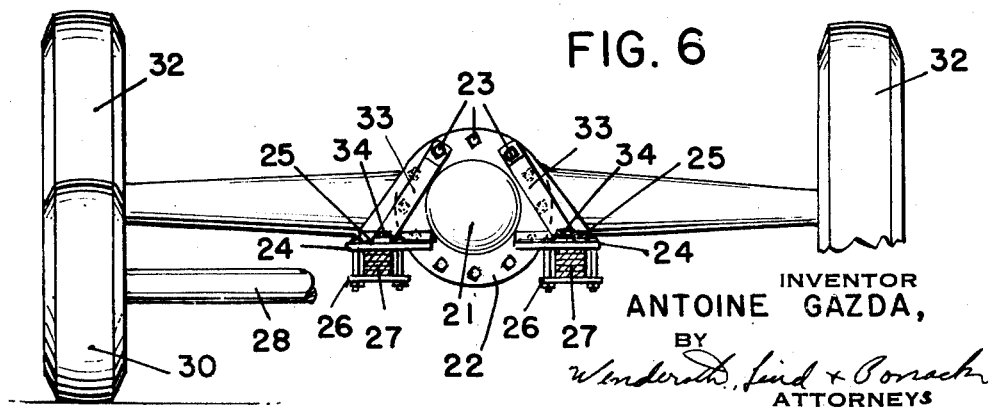
Fig. 6 is a sectional view taken along the line 6—6 of Fig. 4.

The snow track 20 as shown in Figs. 4, 5 and 6 is attached to a vehicle having a banjo type differential housing 21. The attaching plate 22 is designed to replace the removable back plate on the differential housing and is secured to the housing by means of the bolts 23. This attaching plate 22 is substantially L shaped in cross section having flanges 24, hinged to the attaching plate 22 by hinge 25 and constituting the upper half of brackets 26. The springs 27 are attached to the brackets 26, as shown in Fig. 5, and form a cantilever suspension for the auxiliary axle 28 attached thereto by means of brackets such as 29. The idler wheels 30 are rotatably journalled on the auxiliary axle 28 and the endless track 31 is trained over the driving wheels 32 and the idler wheels 30. The operation is the same as that described for Fig. 1 but only one set of idler wheels 30 and one auxiliary axle 28 are provided, these being mounted rearward of the driving wheels 32 of the vehicle. In this type of snow track, the driving wheel 32 revolves and the endless belt will move therewith providing an increased friction surface to prevent skidding and slipping of the vehicle. In order to facilitate removal of the belt 31 from the idler wheels 30 and the driving wheels 32, the springs 27 are hingedly secured to the differential 21 as above set forth. A bar 33 attachable to the plate 22 by means of stud bolts 23 and to flange 24 by bolts 34 permits securing of the springs 27 in a rigid manner but also allows, upon removal of the bar 33 from this position, the idler wheels 30 to be raised either to an inoperative position to facilitate removal of the belt 31 or to allow the belt to trail the wheel 32 freely over obstructions without the spring 27 being active.

Figure 7:
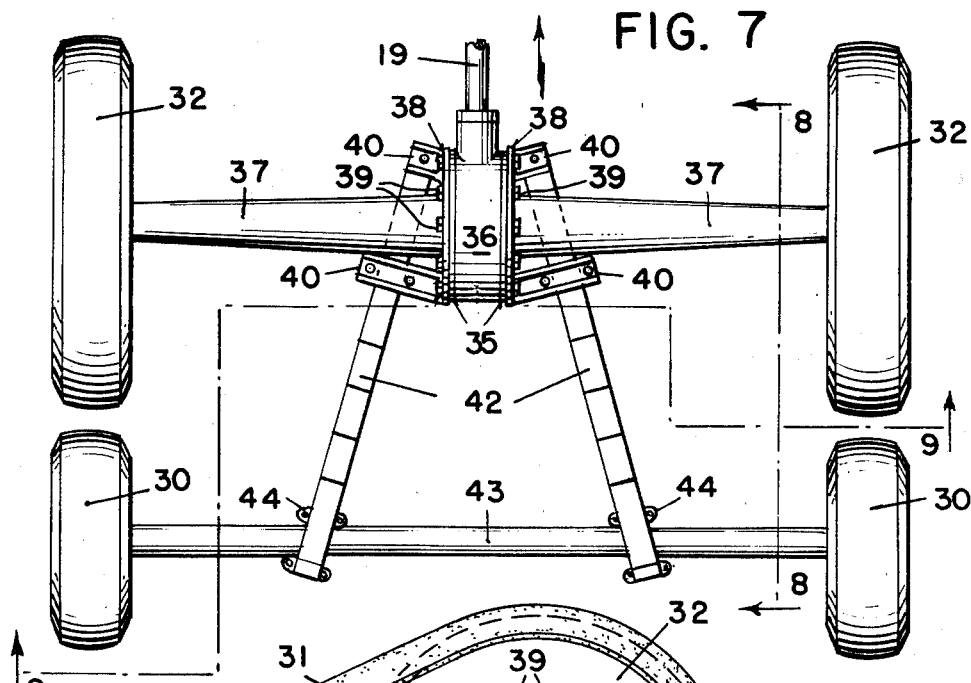
Fig. 7 is a top plan view of a form of the invention attached to a vehicle having removable side plates on the differential housing, the snow track having a single auxiliary set of wheels.
Figure 8:
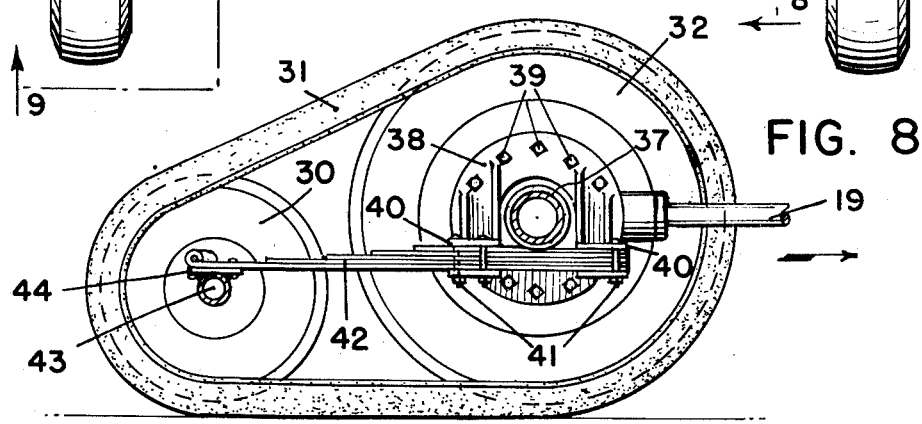
Fig. 8 is a sectional view taken along the line 8—8 of Fig. 7.
Figure 9:
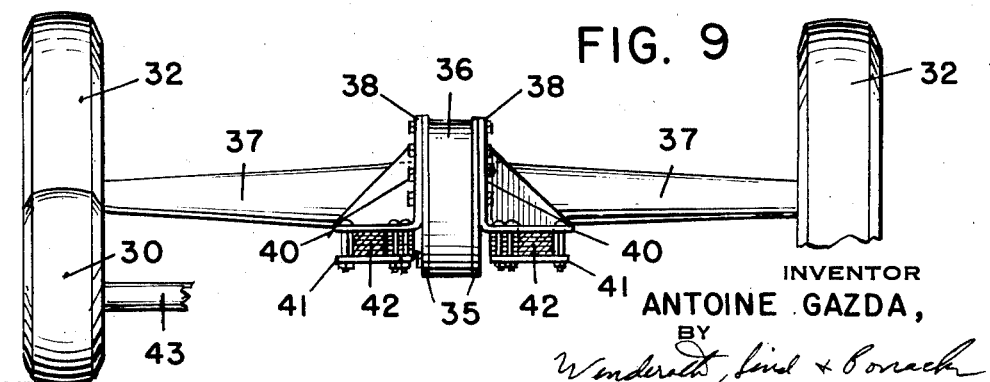
Fig. 9 is a sectional view taken along the line 9—9 of Fig. 7.

Figs. 7, 8 and 9 show attachment of snow tracks corresponding to the type shown in Fig. 4 but applied to vehicles having removable side plates 35 on the differential housing 36 which are integral with the rear axle housing 37. The attaching plates 38 are substantially U-shaped in elevation and L-shaped in cross section. These attaching plates 38 are fitted over the axle housing 37 and then attached to the differential housing 36 by means of studs 39 which may replace the bolts holding the side plates 35 to the housing 36. The attaching plates 38 are provided with flanges 40 which constitute the upper half of brackets 41 to hold springs 42. The springs 42 are of a cantilever type and the auxiliary axle 43 is attached thereto by means of brackets 44 as shown in Fig. 8. The operation of this type of track is similar to that of Fig. 4, applied to a different type of differential housing.

Figure 10:
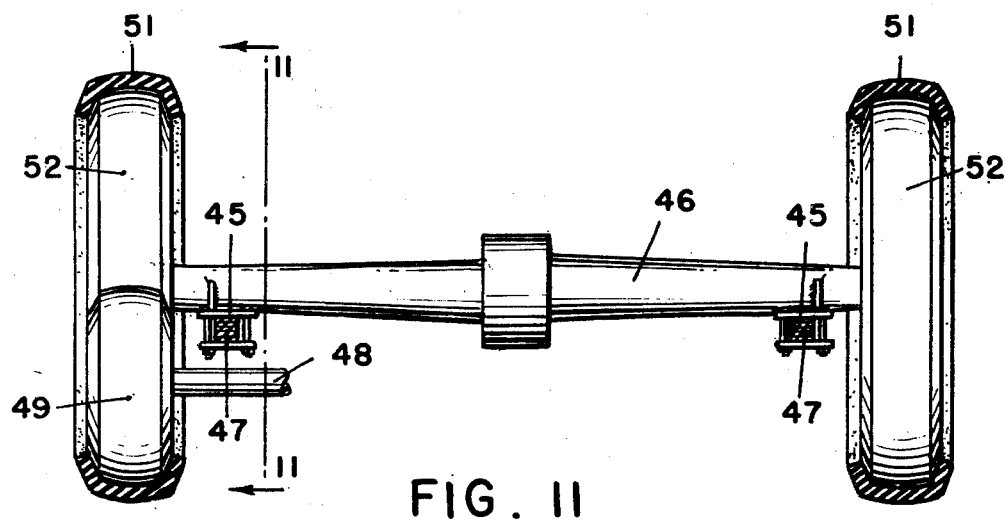
Fig. 10 is a fragmentary rear elevational view of another form of the invention wherein the snow track is suspended from the rear axle housing by members integral therewith.
Figure 11:
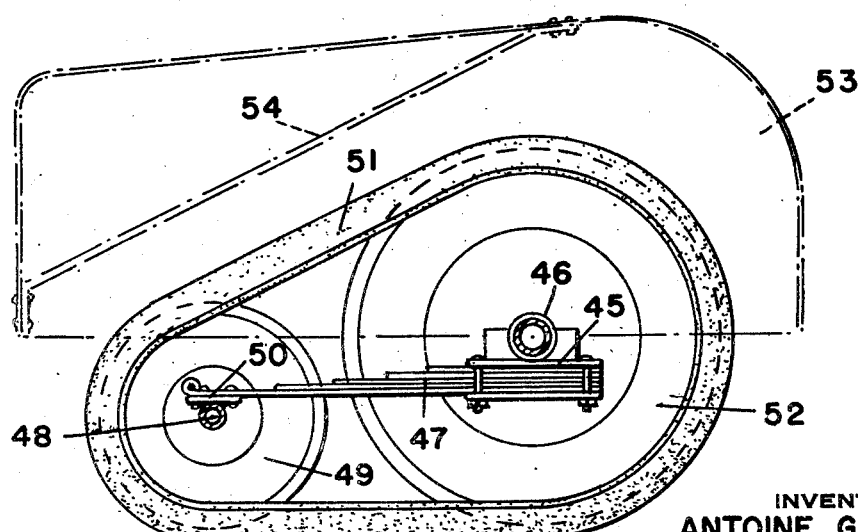
Fig. 11 is a sectional view taken along the line 11—11 of Fig. 10.

Figs. 10 and 11 show a further method of attaching the snow tracks wherein permanent connecting means, such as brackets 45, are integrally attached to the rear axle housing 46 by welding or the like. The brackets 45 hold the cantilever springs 47 for suspension of the auxiliary axle 48 on which are rotatably mounted idler wheels 49. The axle 48 is attached to the springs 47 by means of brackets 50. The endless belt 51 is trained over the driving wheels 52 and the idler wheels 49 and moves with the wheels. Fig. 11 shows a fender 53 having a brace 54 and covering the upper portion of the snow track, and shows clearly that with the present invention no interference with any parts of the vehicle will occur when the snow track is being used.

As stated previously the snow track may take different forms of construction in order to adapt it most advantageously to conditions prevailing in the area where it is to be used. The tread can be similar to standard tire treads or have raised projections thereon to give it better traction.

The raised projections can be arranged parallel or arranged obliquely and also in a herringbone pattern.

The endless belt may be trained directly over the wheel without having a tire mounted thereon and in a standard drop center type have raised lugs attached around the periphery of the drop center by welding or other suitable means. These lugs can be trapezoidal to allow for easy meshing with slots in the endless belt. The endless belt may be constructed of rubber impregnated fabric or other suitable material and is so formed as to seat snugly.

Various other arrangements, of course, can be effected without departing from the scope of this invention.

Having thus described my invention with particularity with reference to presently preferred forms of the same, what I claim is:

1. In a snow track for a motor vehicle having driving wheels, driving mechanism therefor and a housing for said driving mechanism, the combination of a first pair of cantilever springs each having one end rigidly and non-rotatably secured to said housing extending forwardly of said driving wheels, a second pair of cantilever springs each having one end rigidly and non-rotatably secured to said housing extending rearwardly of said driving wheels, a first auxiliary axle rigidly attached to the free ends of said forwardly extending cantilever springs, a second auxiliary axle rigidly attached to the free ends of said rearwardly extending cantilever springs, a plurality of idler wheels rotatably mounted on said auxiliary axles, a plurality of endless belts, each of said endless belts being trained over one of said idler wheels on each of said axles and the corresponding driving wheel of said vehicle whereby upon rotation of said driving wheels, the said endless belts and the said idler wheels will revolve therewith to increase the traction of said vehicle.

2. In a snow track for a motor vehicle having driving wheels, a differential, a housing for said differential having side plates thereon, a rear axle housing, an auxiliary axle, idler wheels rotatably mounted on said auxiliary axle, attaching means for the said auxiliary axle, the said attaching means comprising a set of supporting plates mounted on said side plates of said differential housing and fitting over said rear axle housing, a plurality of cantilever springs each having an end thereof rigidly fixed on said supporting plates, said auxiliary axle being fixed to the free ends of said cantilever springs and an endless track trained over said driving wheels and said idler wheels revolving therewith to improve traction of said vehicle.

3. In a snow track for a motor vehicle having driving wheels and a driving system with a differential and housing therefor, the combination of an auxiliary axle, idler wheels rotatably mounted on said auxiliary axle, attaching means for said auxiliary axle comprising a plate secured to said housing, a plurality of brackets on said plate, a portion of each of said brackets being integral with said plate, a plurality of cantilever springs corresponding to the number of said brackets, each of said springs being rigidly secured at one end to a corresponding one of said brackets, means for rigidly attaching said auxiliary axle to the free ends of said springs and a plurality of endless belts, each of said belts being trained over one of said driving wheels and the corresponding idler wheel for revolving with said driving wheel to improve the traction of said vehicle.

4. In a snow track for a motor vehicle having driving wheels and a driving system provided with a differential and a rear axle, a housing for said differential and said rear axle, the combination of an auxiliary axle, idler wheels rotatably mounted on said auxiliary axle, attaching means for said auxiliary axle comprising a plate secured to said housing, a plurality of flanges pivotally attached to said plate, a plurality of cantilever springs corresponding in number to said flanges, means for securing each spring rigidly at one end thereof to a corresponding one of said pivoted flanges for movement into operable or inoperable position, brackets located at the free ends of each said cantilever springs for rigidly securing said auxiliary axle to the free ends of said springs and a plurality of endless belts, each of said endless belts being trained over one of said driving wheels and the corresponding idler wheel for revolving with said driving wheel to improve the traction of said vehicle when said springs are in operable position.

5. In a snow track for a motor vehicle as claimed in claim 4, a plurality of bars corresponding in number to said flanges and each extending between said plate and one of said flanges, the ends of said bars being removably secured to said flanges and said plate, said bars preventing movement between the respective pivoted flange and said plate when in secured position thereby placing said spring in operable position and permitting pivoting movement of said springs with relation to said plate when said bars are detached from said flanges for placing said springs in inoperable position.

6. In a snow track for a motor vehicle having driving wheels and a driving system with a differential and housing therefor, the combination of an auxiliary axle, idler wheels rotatably mounted on said auxiliary axle, attaching means for said auxiliary axle comprising a plate secured to said housing, a plurality of brackets on said plate, a plurality of cantilever springs corresponding to the number of said brackets, each of said springs being rigidly secured at one end to a corresponding one of said brackets, means for rigidly attaching said auxiliary axle to the free ends of said springs and a plurality of endless belts, each of said belts being trained over one of said driving wheels and the corresponding idler wheel for revolving with said driving wheel to improve the traction of said vehicle.

7. In a snow track for a motor vehicle having driving wheels and a driving system with a differential and housing therefor, the combination of an auxiliary axle, idler wheels rotatably mounted on said auxiliary axle, attaching means for said auxiliary axle comprising a plate secured to said housing, a plurality of cantilever springs, means for securing one end of each of said cantilever springs to said plate, means for rigidly attaching said auxiliary axle to the free ends of said springs and a plurality of endless belts, each of said belts being trained over one of said driving wheels and the corresponding idler wheel for revolving with said driving wheel to improve the traction of said vehicle.

8. In a snow track for a motor vehicle having driving wheels, a driving system, a differential and a housing therefor having a rearwardly directed opening therein, the combination of an auxiliary axle, idler wheels rotatably mounted on said auxiliary axle, a plate detachably secured to said housing and covering said opening, a plurality of cantilever springs, means for securing one end of each of said cantilever springs to said plate, means for rigidly attaching said auxiliary axle to the free ends of said springs and a plurality of endless belts, each of said belts being trained over one of said driving wheels and the corresponding idler wheel for revolving with said driving wheel to improve the traction of said vehicle.

9. In a snow track for a motor vehicle having driving wheels and a driving system provided with a diifferential and a rear axle, a housing for said differential and said rear axle, the combination of an auxiliary axle, idler wheels rotatably mounted on said auxiliary axle, attaching means for said auxiliary axle comprising a plate secured to said housing, pivotable supporting means secured to said plate, a plurality of cantilever springs, means for securing one end of each of said cantilever springs to said supporting means for movement to operable and inoperable position, brackets located at the free ends of each said cantilever springs for rigidly securing said auxiliary axle to the free ends of said springs and a plurality of endless belts, each of said endless belts being trained over one of said driving wheels and the corresponding idler wheel for revolving with said driving wheel to improve the traction of said vehicle when said springs are in operable position.

10. In a snow track for a motor vehicle as claimed in claim 9 wherein there is provided means cooperating with said plate for locking said supporting means for said springs in operable position.

ANTOINE GAZDA.

References Cited in the file of this patent

UNITED STATES PATENTS

| Number | Name | Date |
|---|---|---|
| 1,450,643 | Platt | Apr. 3, 1923 |
| 1,539,582 | Landry | May 26, 1925 |
| 1,697,915 | Fast | Jan. 8, 1929 |
| 1,774,835 | Lombard | Sept. 2, 1930 |
| 1,907,236 | Bellerive | May 2, 1933 |
| 2,385,453 | Leguillon | Sept. 25, 1945 |
| 2,423,544 | Acton | July 8, 1947 |
| 2,476,460 | Smith | July 19, 1949 |
| 2,554,553 | Benz | May 29, 1951 |

FOREIGN PATENTS

| Number | Country | Date |
|---|---|---|
| 458,391 | France | Aug. 5, 1913 |
| 591,473 | France | Apr. 10, 1925 |